(12) United States Patent
Lee

(10) Patent No.: US 8,553,999 B2
(45) Date of Patent: Oct. 8, 2013

(54) METHOD AND SYSTEM FOR PROVIDING TILE MAP SERVICE USING SOLID COMPRESSION

(75) Inventor: Ki Jung Lee, Gyeonggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 44 days.

(21) Appl. No.: 13/305,204

(22) Filed: Nov. 28, 2011

(65) Prior Publication Data

US 2012/0134599 A1    May 31, 2012

(30) Foreign Application Priority Data

Nov. 29, 2010 (KR) .................. 10-2010-0119943

(51) Int. Cl.
*H04N 7/50* (2006.01)

(52) U.S. Cl.
USPC ............ 382/232; 382/233; 382/239; 382/243

(58) Field of Classification Search
USPC .......... 382/108, 232, 233, 239, 243; 345/428, 345/418, 660; 348/E5.066; 375/240.16, 375/240.03; 701/450
See application file for complete search history.

(56) References Cited

U.S. PATENT DOCUMENTS

| 6,141,454 A * | 10/2000 | Seymour et al. | 382/243 |
| 6,278,432 B1 * | 8/2001 | Ratnakar | 715/748 |
| 7,873,465 B2 * | 1/2011 | Geelen et al. | 701/450 |
| 8,243,102 B1 * | 8/2012 | Cornell | 345/660 |
| 2003/0231190 A1 | 12/2003 | Jawerth et al. | 345/440 |
| 2008/0249704 A1 | 10/2008 | Cummings | 701/200 |
| 2010/0201707 A1 | 8/2010 | Rasmussen et al. | 701/208 |

FOREIGN PATENT DOCUMENTS

KR    10-2004-0025106    3/2004

* cited by examiner

*Primary Examiner* — Anh Do
(74) *Attorney, Agent, or Firm* — Staas & Halsey LLP

(57) ABSTRACT

The system according to the present invention includes a server including a map data storage device, which stores digital map data, a plurality of tile map data generated from the digital map data, and solid-compressed map data compressed by solid compression from the plurality of tile map data, a solid-compressed map data generation device, which generates the plurality of tile map data from the digital map data stored in the map data storage device, generates the solid-compressed map data by compressing the plurality of tile map data by solid compression, and stores the generated solid-compressed map data in the map data storage device, and a solid-compressed map data providing device, which transmits the solid-compressed map data to a client through a network in response to a request from the client. Therefore, it is possible to reduce the frequency of network access and the amount of data transmitted.

12 Claims, 5 Drawing Sheets

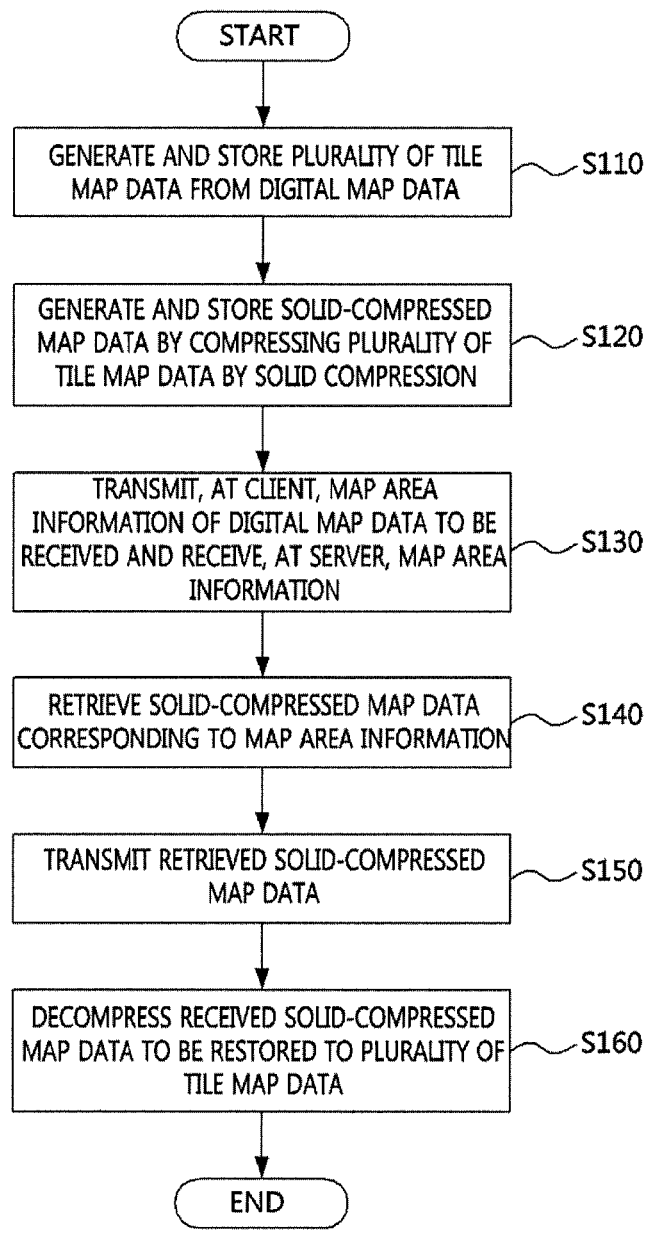

METHOD AND SYSTEM FOR PROVIDING TILE MAP SERVICE USING SOLID COMPRESSION

CROSS-REFERENCE TO RELATED PATENT APPLICATION

This application claims the benefit of Korean Patent Application No. 10-2010-0119943, filed on Nov. 29, 2010, in the Korean Intellectual Property Office, the disclosure of which is incorporated herein in its entirety by reference.

BACKGROUND OF THE INVENTION

1. Field of the Invention

The present invention relates to a method and system for providing a tile map service and, more particularly, to a method for providing a tile map service, which can effectively transmit, receive, and restore a tile map in a service for transmitting and receiving a large and high-resolution tile map, and a system for the same.

2. Description of the Related Art

A geospatial information service technology is a technology that digitizes a variety of spatial phenomenon information and provides the digitized information to a user such that the user can effectively identify various spatial, physical and social phenomena.

A technique for providing digital map data in the geospatial information service technology typically uses a tile map service. The tile map service means a service that divides original digital map data into a plurality of map tiles in the form of a grid and transmits only map tiles selected from the original digital map data and corresponding to a request from a receiving client such that the receiving client generates the original map data by combining the received map tiles. For example, the receiving client can receive a map service without transmitting large original digital map data in such a manner that only map tiles corresponding to the current location of the user or the point where that the user wishes to move are selected from the original entire map data and transmitted. A representative example of the tile map service includes Google map service provided by Internet portal sites such as Google, etc. Prior art related to the tile map service of Google includes U.S. Patent Publication No. 20100201707 entitled "Digital Mapping System" filed by the same company.

Meanwhile, even in the case of such a tile map service, numerous tile map data are individually generated from the original digital map data, and thus the amount of tile map data itself is increased. Moreover, numerous tile map data corresponding to a map area requested by a client should be transmitted one by one at a time, and thus excessive network access between the client and the server occurs, which is problematic.

To solve such problems, Korean Patent Publication No. 10-2004-0025106 discloses a method of providing map data, in which map data consisting of vector data and image data is divided into a plurality of tile regions in the form of a checkerboard, the vector data and the image data are coded for each tile region and stored in a database, and only tile region data corresponding to a map area requested by a client is transmitted to the client.

However, even when adopting the prior art methods, significant delays in transmitting, receiving, and restoring a map tile including precise image data may occur. In particular, when the user requests a plurality of map areas, it is very difficult to effectively provide geospatial information. That is, when the user moves quickly, for example, significant delays in transmitting, receiving, and restoring precise tile map data may occur, which is problematic.

SUMMARY OF THE INVENTION

The present invention has been made in an effort to solve the above-described problems associated with prior art, and an object of the present invention is to provide a system for providing a tile map service using solid compression, which can effectively provide a tile map service by reducing the frequency of network access and the amount of data transmitted in such a manner that a plurality of tile map data are compressed using a solid compression technique and the compressed map data is transmitted and restored in a service for providing a geospatial information service.

Another object of the present invention is to provide a method for providing a tile map service using solid compression, which can effectively provide a tile map service by reducing the frequency of network access and the amount of data transmitted in such a manner that a plurality of tile map data are compressed using a solid compression technique and the compressed map data is transmitted and restored in a service for providing a geospatial information service.

According to an aspect of the present invention to achieve the above objects, there is provided a system for providing a tile map service using solid compression, the system comprising a server and a client which receives a tile map service from the server through a network, wherein the server comprises a map data storage device, which stores digital map data, a plurality of tile map data generated from the digital map data, and solid-compressed map data compressed by solid compression from the plurality of tile map data, a solid-compressed map data generation device, which generates the plurality of tile map data from the digital map data stored in the map data storage device, generates the solid-compressed map data by compressing the plurality of tile map data by solid compression, and stores the generated solid-compressed map data in the map data storage device, and a solid-compressed map data providing device, which transmits the solid-compressed map data to the client through the network in response to a request from the client, and wherein the client comprises a solid-compressed map data restoration device which provides map area information of digital map data to be received to the solid-compressed map data providing device of the server, receives solid-compressed map data corresponding to the map area information from the solid-compressed map data providing device of the server, and decompresses the received solid-compressed map data to be restored to a plurality of tile map data.

When the digital map data has a resolution with a width of W and a height of H (where each of W and H is a natural number), each of the plurality of tile map data may have a resolution with a width of W/M and a height of H/M (where each of M and N is a natural number).

The solid compression may be performed by treating all or part of the plurality of tile map data as a single data block.

According to another aspect of the present invention to achieve the objects, there is provided a server for providing a tile map service through a network, the server comprising: a map data storage device which stores digital map data, a plurality of tile map data generated from the digital map data, and solid-compressed map data compressed by solid compression from the plurality of tile map data; a solid-compressed map data generation device including a tile map data generation unit, which divides the digital map data stored in the map data storage device into a plurality of tile map data and stores the divided tile map data in the map data storage device, and a solid-compressed map data generation unit, which generates solid-compressed map data by compressing the plurality of tile map data stored in the map data storage device by solid compression and stores the generated solid-compressed map data in the map data storage device; and a solid-compressed map data providing device including a solid-compressed map data retrieval unit, which retrieves the generated solid-compressed map data from the map data storage device based on the map area information received from a client, and a solid-compressed map data transmission unit which reads the solid-compressed map data retrieved by the solid-compressed map data retrieval unit from the map data storage device and transmits the read data to the client.

According to still another aspect of the present invention to achieve the objects, there is provided a client for receiving a tile map service through a network, the client comprising: a solid-compressed map data restoration device including a map area request unit, which transmits map area information to a server through the network, and a tile map restoration unit, which receives solid-compressed map data corresponding to the map area information from the server and decompresses the received solid-compressed map data to be restored to a plurality of tile map data; and a map data display device which receives the plurality of tile map data from the tile map restoration unit, generates digital map data by combining the plurality of tile map data, and stores the generated digital map data or provides the generated digital map data to a user.

According to yet another aspect of the present invention to achieve the objects, there is provided a method for providing a tile map service through a network, the method comprising: generating and storing a plurality of tile map data from digital map data; generating and storing solid-compressed map data by compressing the plurality of tile map data by solid compression; transmitting, at a client, map area information of digital map data to be received and receiving, at a server, the map area information; retrieving solid-compressed map data corresponding to the map area information; transmitting the retrieved solid-compressed map data; and decompressing the received solid-compressed map data to be restored to a plurality of tile map data.

BRIEF DESCRIPTION OF THE DRAWINGS

The above and other features and advantages of the present invention will become more apparent by describing in detail exemplary embodiments thereof with reference to the attached drawings in which:

FIG. 5 is a flowchart illustrating a method for providing a tile map service using solid compression in accordance with another exemplary embodiment of the present invention.

DETAILED DESCRIPTION OF THE INVENTION

Figure 1:
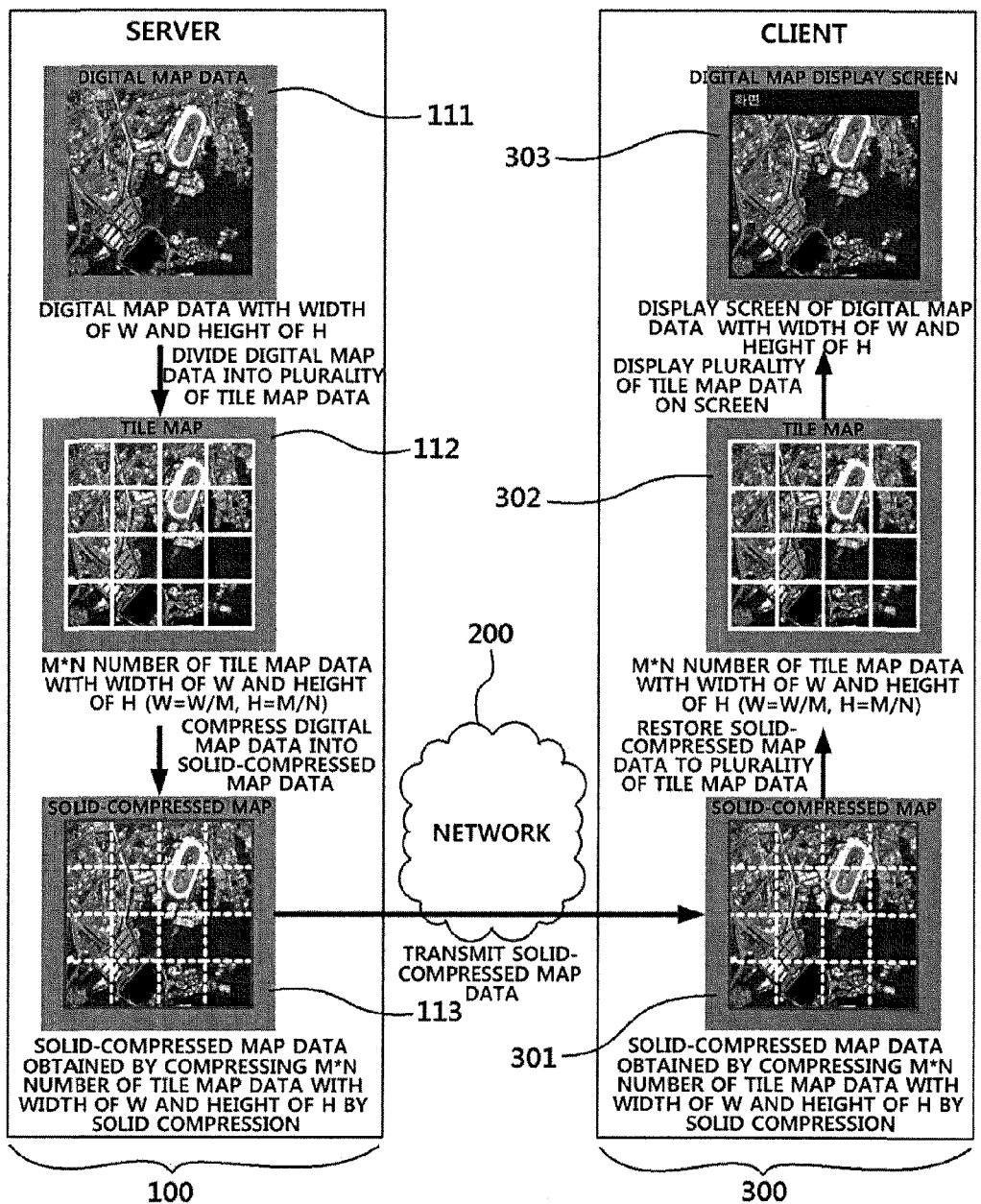
FIG. 1 is a diagram illustrating the concept of a tile map service using solid compression in accordance with the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

FIG. 1 is a diagram illustrating the concept of a tile map service using solid compression in accordance with the present invention.

Referring to FIG. 1, according to a tile map service using solid compression in accordance with the present invention, a server 100 for providing a map service divides original digital map data 111 having a resolution with a width of W and a height of H (W*H) into M*N number of tile map data 112 having a resolution with a width of w and a height of h, where w may be equal to W/M and h may be equal to H/N.

Here, the values of M and N may be determined based on the characteristics of the digital map data 111 such as the resolution (W*H) of the original digital map data 111.

Next, the server 100 compresses the M*N number of divided tile map data 112 by solid compression.

Solid compression refers to a method for data compression of multiple files, in which the multiple files are not compressed individually but treated as a single data block and compressed. For example, in the case of individual file compression, the compression is performed using the redundancy present in each individual file. However, in the case of solid compression, the multiple files are treated as a single file and compressed, and thus the redundancy across multiple files can be removed, thereby increasing the efficiency of the compression. In particular, in the case of map data, the correlation between tile map data is high due to the nature of the map, and thus the efficiency of the compression can be further improved by the solid compression of multiple tile map data.

Then, the server 100 transmits solid-compressed map data 113 to a client 300 through a network 200.

The operation of the client 300 receiving the solid-compressed map data 113 through the network 200 may be understood as being opposite to that of the server 100 described above.

The client 300 decompresses the solid-compressed map data received through the network 200 to be restored to M*N number of tile map data 302 having a resolution with a width of w and a height of h, respectively. Lastly, the M*N number of tile map data 302 are combined into digital map data having a resolution with a width of W and a height of H and restored to the digital map data 303 that the sending server wishes to transmit.

Figure 2:
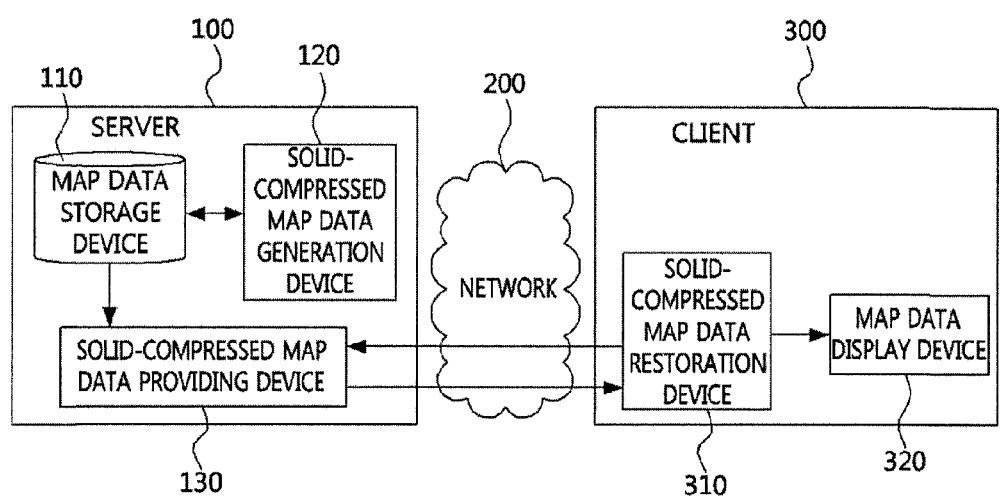
FIG. 2 is a block diagram illustrating the configuration of a system for providing a tile map service using solid compression in accordance with an exemplary embodiment of the present invention.

Exemplary Configuration of System for Providing Tile Map Service According to the Present Invention FIG. 2 is a block diagram illustrating the configuration of a system for providing a tile map service using solid compression in accordance with an exemplary embodiment of the present invention.

Referring to FIG. 2, a system for providing a tile map service using solid compression in accordance with an exemplary embodiment of the present invention may comprise a sending server 100, which includes a map data storage device 110, a solid-compressed map data generation device 120, and a solid-compressed map data providing device 130, and a client 300 which includes a solid-compressed map data restoration device 310 and a map data display device 320.

The map data storage device 110 of the server 100 is a file system or database for storing tile map data, i.e., original tile map data having a high resolution with a width of W and a height of H (W*H), M*N number of tile map data having a resolution with a width of w and a height of h (w*h) and generated from the tile map data, and solid-compressed map data compressed by solid compression from the M*N number of tile map data, where w is equal to W/M and h is equal to H/N.

Meanwhile, although it has been described above that all of the tile map data has the same resolution of w*h, the tile map data may have different resolutions in some implementations. This means that there is no necessity for the tile map data to have a square or rectangular shape of equal size.

The solid-compressed map data generation device 120 of the server 100 reads digital map data from the map data storage device 110, divides the digital map data into a plurality of tile map data, and stores the divided data in the map data storage device 110. Moreover, the solid-compressed map data generation device 120 reads the plurality of generated tile map data from the map data storage device 110, generates solid-compressed map data by compressing the plurality of tile map data by solid compression, and stores the solid-compressed map data in the map data storage device 110.

The solid-compressed map data providing device 130 receives a request including map area information from the client 300, retrieves solid-compressed map data requested by the client 30 from the map data storage device 110, reads the retrieved data from the map data storage device 110, and transmits the read data to the client 300 through the network 200.

Moreover, the network 200 includes various types of wired and wireless networks, through which the tile map data can be exchanged between the server 100 and the client 300. For example, when the client 300 is a smart phone, a mobile communication terminal, etc., the network 200 may be a wireless mobile communication network such as CDMA, WCDMA, LTE, WiMax, etc. and, when the client 300 is a stationary computer, the network 200 may be a wired Internet network.

Meanwhile, the client 300 may comprise a solid-compressed map data restoration device 310 and a map data display device 320.

The solid-compressed map data restoration device 310 provides map area information of digital map data to be received to the solid-compressed map data providing device 130 of the server 100, receives solid-compressed map data corresponding to the map area information from the solid-compressed map data providing device 130 of the server 100, and decompresses the received solid-compressed map data to be restored to a plurality of tile map data.

The map data display device 320 generates digital map data of the desired map area by combining the plurality of tile map data and stores the generated digital map data or provides the generated digital map data to a user through a display device, for example.

Next, the configurations of the server 100 and the client 300 will be described in more detail with reference to FIGS. 3 and 4.

Figure 3:
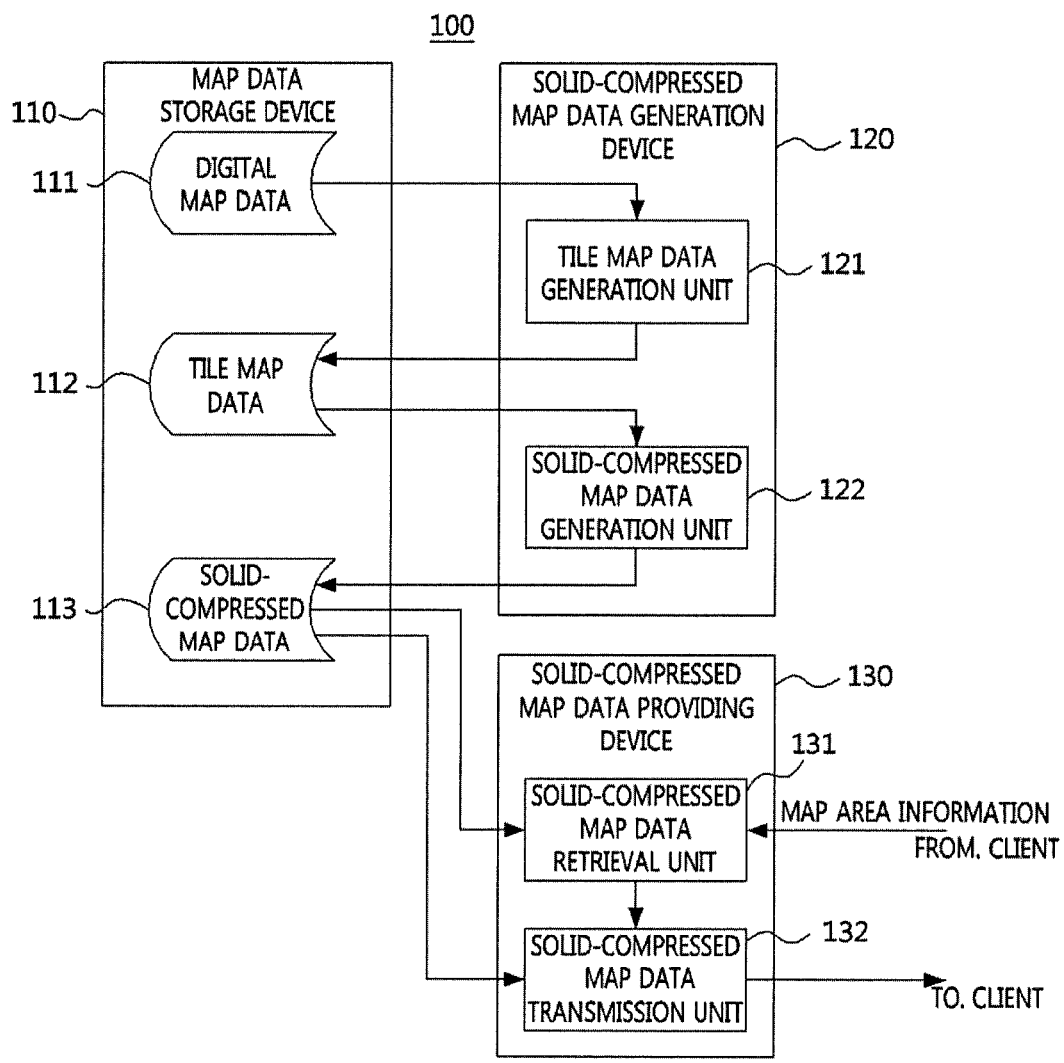
FIG. 3 is a block diagram illustrating the configuration of a sending server in a system for providing a tile map service using solid compression in accordance with an exemplary embodiment of the present invention.

Exemplary Configuration of Server in System for Providing Tile Map Service According to the Present Invention FIG. 3 is a block diagram illustrating the configuration of a sending server in a system for providing a tile map service using solid compression in accordance with an exemplary embodiment of the present invention.

Referring to FIG. 3, the server 100 of the tile map serve system in accordance with an exemplary embodiment of the present invention may comprise a map data storage device 110, a solid-compressed map data generation device 120, and a solid-compressed map data providing device 130.

The map data storage device 110 is a file system or database for storing digital map data 111, i.e., original map data having a high resolution with a width of W and a height of H (W*H), M*N number of tile map data 112 having a resolution with a width of w and a height of h (w*h) and generated from the digital map data 111, and solid-compressed map data compressed by solid compression from the M*N number of tile map data, where w is equal to W/M and h is equal to H/N, which is the same as described above.

The solid-compressed map data generation device 120 may comprise a tile map data generation unit 121 and a solid-compressed map data generation unit 122. The tile map data generation unit 121 receives digital map data 111 from the map data generation device 100 and generates a plurality of tile map data 112, and the solid-compressed map data generation unit 122 receives the plurality of tile map data 112 from the map data storage device 110, generates solid-compressed map data 113 by compressing the plurality of tile map data 112 by solid compression, and stores the generated solid-compressed map data 113 in the map data storage device 110.

The solid-compressed map data providing device 130 may comprise a solid-compressed map data retrieval unit 131 and a solid-compressed map data transmission unit 132.

The solid-compressed map data retrieval unit 131 receives map area information of digital map data that the client 300 wishes to receive from the client 300 through the network 200 and retrieves solid-compressed map data 113 corresponding to the map area information from the map data storage device 110.

The solid-compressed map data transmission unit 132 transmits the solid-compressed map data 113 retrieved by the solid-compressed map data retrieval unit 131 to the client 300 through the network 200.

Figure 4:
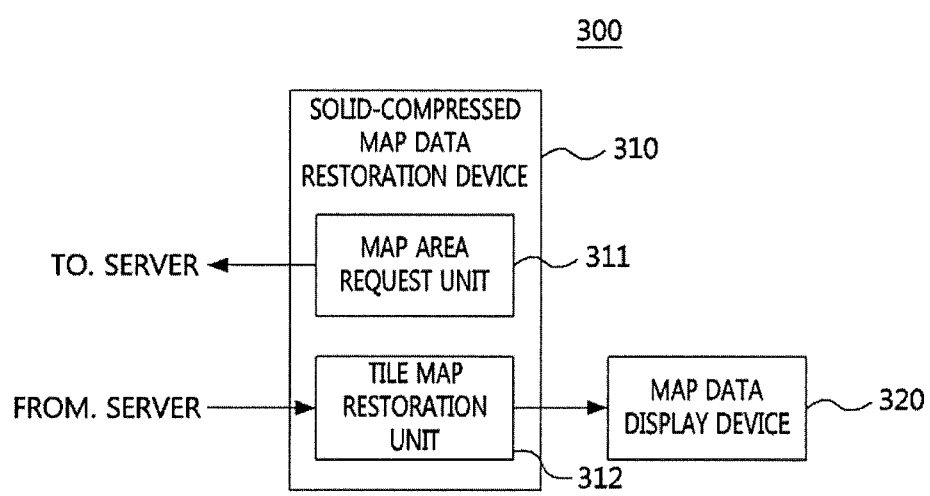
FIG. 4 is a block diagram illustrating the configuration of a receiving client in a system for providing a tile map service using solid compression in accordance with an exemplary embodiment of the present invention.

Exemplary Configuration of Client in System for Providing Tile Map Service According to the Present Invention FIG. 4 is a block diagram illustrating the configuration of a receiving client in a system for providing a tile map service using solid compression in accordance with an exemplary embodiment of the present invention.

Referring to FIG. 4, the client 300 of the tile map serve system in accordance with an exemplary embodiment of the present invention may comprise a solid-compressed map data restoration device 310 and a map data display device 320.

The solid-compressed map data restoration device 310 may comprise a map area request unit 311 and a tile map restoration unit 312. The map area request unit 311 generates map area information of digital map data that the client 300 wishes to receive in response to a request from a user and transmits the generated map area information to the server 100 through the network 200. The map area information transmitted from the map area request unit 311 is provided to the solid-compressed map data retrieval unit 131 of the solid-compressed map data providing device 130.

The tile map restoration unit 312 receives solid-compressed map data, which corresponds to the map area information and is transmitted from the map area request unit 311, from the solid-compressed map data transmission unit 132 of the server 100, decompresses the received solid-compressed map data to be restored to a plurality of tile map data.

The plurality of tile map data generated by the tile map restoration unit 312 are finally output to the map data display device 320, and the map data display device 320 generates the entire digital map data by combining the plurality of tile map data and stores the generated digital map data or provides the generated digital map data to the user through a display device.

Method for Providing Tile Map Service According to the Present Invention

FIG. 5 is a flowchart illustrating a method for providing a tile map service using solid compression in accordance with another exemplary embodiment of the present invention.

Referring to FIG. 5, a method for providing a tile map service in accordance with another exemplary embodiment of the present invention may comprise a step (S110) of generating and storing a plurality of tile map data from digital map data, a step (S120) of generating and storing solid-compressed map data by compressing the plurality of tile map data by solid compression, a step (S130) of transmitting, at a client, map area information of digital map data to be received and receiving, at a server, the map area information, a step (S140) of retrieving solid-compressed map data corresponding to the map area information, a step (S150) of transmitting the retrieved solid-compressed map data, and a step (S160) of decompressing the received solid-compressed map data to be restored to a plurality of tile map data.

Next, the above steps will be described in detail.

First, step S110 of generating and storing the plurality of tile map data from the digital map data and step S120 of generating and storing the solid-compressed map data by compressing the plurality of tile map data by solid compression are performed by a server 100.

That is, a tile map data generation unit 121 and a solid-compressed map data generation unit 122 generate a plurality of tile map data 112 using digital map data 111 stored in a map data storage device 110, generate solid-compressed map data 113 using the plurality of generated tile map data 112, and store the generated solid-compressed map data in the map data storage device 110.

Next, in step S130 of transmitting, at the client, the map area information of digital map data to be received and receiving, at the server, the map area information, when a map area request unit 311 of the client 300 transmits map area information that a user wishes to receive through a network 200, a solid-compressed map data retrieval unit 131 receives the map area information.

Step S140 of retrieving the solid-compressed map data corresponding to the map area information is performed by the server 100, in which the solid-compressed map data retrieval unit 131 retrieves solid-compressed map data 113 stored in the map data storage device 110 based on the received map area information.

In step S150 of transmitting the solid-compressed map data 113 retrieved by the solid-compressed map data retrieval unit 131, the solid-compressed map data 113 is transmitted from the solid-compressed map data transmission unit 132 to a tile map restoration unit 312 through the network 200.

Lastly, step S160 of decompressing the received solid-compressed map data to be restored to a plurality of tile map data is performed by the client 300, in which the tile map restoration unit 312 of the client 300 decompresses the received solid-compressed map data to be restored to a plurality of tile map data. The plurality of restored tile map data are combined into digital map data and stored in the map data storage device 110 or provided to the user through a display device.

As described above, according to the method and system for providing the tile map service of the present invention, it is possible to effectively provide a tile map service by reducing the frequency of network access and the amount of data transmitted in such a manner that a plurality of tile map data are compressed using a solid compression technique and the compressed map data is transmitted and restored in a service for providing a geospatial information service.

While the existing geospatial information services based on tile map data are inefficient due to the excessive network access and the excessive amount of data, the method for providing the tile map service based on the solid compression according to the present invention can effectively provide a geospatial information service through the reduced network access and the reduced amount of data using the solid-compressed map data obtained by compressing the tile map data by solid compression.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A system for providing a tile map service using solid compression, the system comprising a server and a client which receives a tile map service from the server through a network, wherein the server comprises a map data storage device, which stores digital map data, a plurality of tile map data generated from the digital map data, and solid-compressed map data compressed by solid compression from the plurality of tile map data, a solid-compressed map data generation device, which generates the plurality of tile map data from the digital map data stored in the map data storage device, generates the solid-compressed map data by compressing the plurality of tile map data by solid compression, and stores the generated solid-compressed map data in the map data storage device, and a solid-compressed map data providing device, which transmits the solid-compressed map data to the client through the network in response to a request from the client, and wherein the client comprises a solid-compressed map data restoration device which provides map area information of digital map data to be received to the solid-compressed map data providing device of the server, receives solid-compressed map data corresponding to the map area information from the solid-compressed map data providing device of the server, and decompresses the received solid-compressed map data to be restored to a plurality of tile map data.

2. The system of claim 1, wherein when the digital map data has a resolution with a width of W and a height of H (where each of W and H is a natural number), each of the plurality of tile map data has a resolution with a width of W/M and a height of H/M (where each of M and N is a natural number).

3. The system of claim 1, wherein the solid compression is performed by treating the plurality of tile map data as a single data block.

4. A server for providing a tile map service through a network, the server comprising:

a map data storage device which stores digital map data, a plurality of tile map data generated from the digital map data, and solid-compressed map data compressed by solid compression from the plurality of tile map data;

a solid-compressed map data generation device including a tile map data generation unit, which divides the digital map data stored in the map data storage device into a plurality of tile map data and stores the divided tile map data in the map data storage device, and a solid-compressed map data generation unit, which generates solid-compressed map data by compressing the plurality of tile map data stored in the map data storage device by solid compression and stores the generated solid-compressed map data in the map data storage device; and a solid-compressed map data providing device including a solid-compressed map data retrieval unit, which retrieves the generated solid-compressed map data from the map data storage device based on the map area information received from a client, and a solid-compressed map data transmission unit which reads the solid-compressed map data retrieved by the solid-compressed map data retrieval unit from the map data storage device and transmits the read data to the client.

5. The server of claim 4, wherein when the digital map data has a resolution with a width of W and a height of H (where each of W and H is a natural number), each of the plurality of tile map data has a resolution with a width of W/M and a height of H/M (where each of M and N is a natural number).

6. The server of claim 4, wherein the solid compression is performed by treating the plurality of tile map data as a single data block.

7. A client for receiving a tile map service through a network, the client comprising:

a solid-compressed map data restoration device including a map area request unit, which transmits map area information to a server through the network, and a tile map restoration unit, which receives solid-compressed map data corresponding to the map area information from the server and decompresses the received solid-compressed map data to be restored to a plurality of tile map data; and a map data display device which receives the plurality of tile map data from the tile map restoration unit, generates digital map data by combining the plurality of tile map data, and stores the generated digital map data or provides the generated digital map data to a user.

8. The client of claim 7, wherein when the digital map data has a resolution with a width of W and a height of H (where each of W and H is a natural number), each of the plurality of tile map data has a resolution with a width of W/M and a height of H/M (where each of M and N is a natural number).

9. The client of claim 7, wherein the solid compression is performed by treating the plurality of tile map data as a single data block.

10. A method for providing a tile map service through a network, the method comprising:

generating and storing, by a server, a plurality of tile map data from digital map data;

generating and storing, by the server, solid-compressed map data by compressing the plurality of tile map data by solid compression;

transmitting, at a client, map area information of digital map data to be received and receiving, at the server, the map area information;

retrieving, by the server, solid-compressed map data corresponding to the map area information;

transmitting, by the server, the retrieved solid-compressed map data to the client; and decompressing, by the server, the received solid-compressed map data to be restored to a plurality of tile map data.

11. The method of claim 10, wherein when the digital map data has a resolution with a width of W and a height of H (where each of W and H is a natural number), each of the plurality of tile map data has a resolution with a width of W/M and a height of H/M (where each of M and N is a natural number).

12. The method of claim 10, wherein the solid compression is performed by treating the plurality of tile map data as a single data block.

* * * * *